(12) United States Patent  (10) Patent No.: US 8,996,258 B2
Liu et al.  (45) Date of Patent: Mar. 31, 2015

(54) VEHICLE SAFETY SYSTEM HAVING METHODS AND APPARATUS CONFIGURABLE FOR VARIOUS VEHICLE GEOMETRIES

(75) Inventors: Hongwei Liu, Terre Haute, IN (US); Barry Davignon, Terre Haute, IN (US)

(73) Assignee: Full-View-Matic, Inc., New Albany, IN (US)

( * ) Notice: Subject to any disclaimer, the term of this patent is extended or adjusted under 35 U.S.C. 154(b) by 0 days.

(21) Appl. No.: 11/589,521

(22) Filed: Oct. 30, 2006

(65) Prior Publication Data

US 2007/0067076 A1 Mar. 22, 2007

Related U.S. Application Data

(62) Division of application No. 10/729,788, filed on Dec. 5, 2003, now Pat. No. 7,130,727.

(51) Int. Cl.
*G01M 17/00* (2006.01)
*G06F 19/00* (2011.01)
*B60R 1/02* (2006.01)

(52) U.S. Cl.
CPC ..................................... B60R 1/025 (2013.01)
USPC ............... 701/49; 701/36; 359/843; 359/872; 180/167; 180/169; 280/426

(58) Field of Classification Search
USPC .............. 367/97, 99, 122, 129, 120; 340/431, 340/435, 870.3; 73/602, 620, 625–629, 73/31.05, 31.06, 634; 701/36, 49; 359/843, 872, 877; 280/426; 180/167, 180/169
See application file for complete search history.

(56) References Cited

U.S. PATENT DOCUMENTS

| | | | |
|---|---|---|---|
| 2,988,957 A | 6/1961 | Kotora, Jr. |
| 3,469,901 A | 9/1969 | Cook et al. |
| 3,527,528 A | 9/1970 | McKee et al. |
| 3,536,382 A | 10/1970 | McKee et al. |
| 3,749,480 A | 7/1973 | De Witt et al. |
| 3,842,397 A | 10/1974 | Sindle |
| 3,950,080 A | 4/1976 | McKee et al. |
| 4,240,152 A | 12/1980 | Duncan et al. |
| 4,609,265 A | 9/1986 | McKee et al. |
| 4,632,525 A | 12/1986 | Hayashi et al. |
| 4,679,158 A | 7/1987 | Tate |
| 4,779,095 A | 10/1988 | Guerreri |
| 4,903,004 A | 2/1990 | Starke et al. |
| 5,056,905 A | 10/1991 | Jensen |
| 5,132,851 A | 7/1992 | Bomar et al. |

(Continued)

*Primary Examiner* — Ronnie Mancho
(74) *Attorney, Agent, or Firm* — King & Schickli, PLLC

(57) ABSTRACT

Methods and apparatus for automatically adjusting the angle of a rotatable side view mirror of an articulated tractor and trailer includes transducers attached to the tractor for transmitting signals toward the trailer and for receiving signals reflected by the trailer. The transducers have a substantially symmetrical arrangement about a centerline of a linear transducer bar attached to the tractor and each has an angular orientation substantially dissimilar to adjacent transducers on a same side of the centerline. A control circuit sequentially activates ones of the transducers such that only a single transducer transmits signals at any given time. Thereafter, the control circuit only processes reflected signals received by the emitting transducer. The control circuit calculates an angle between the tractor and trailer and causes the mirrors to rotate. Transducer calibration and mirror adjustment relative to a zero position set by a driver are also contemplated.

5 Claims, 14 Drawing Sheets

(56) References Cited

U.S. PATENT DOCUMENTS

| | | | |
|---|---|---|---|
| 5,196,965 A | 3/1993 | Lang et al. | |
| 5,306,953 A | 4/1994 | Weiner | |
| 5,719,713 A | 2/1998 | Brown | |
| 5,980,048 A * | 11/1999 | Rannells et al. | 359/843 |
| 6,217,177 B1 * | 4/2001 | Rost | 359/843 |
| 6,264,337 B1 | 7/2001 | Rannells, Jr. et al. | |
| 6,592,230 B2 * | 7/2003 | Dupay | 359/839 |
| 6,826,961 B2 * | 12/2004 | Mamayek | 73/632 |
| 2001/0024333 A1 * | 9/2001 | Rost | 359/843 |
| 2004/0001019 A1 * | 1/2004 | Nakazawa et al. | 342/70 |
| 2005/0022601 A1 * | 2/2005 | Blakley | 73/612 |
| 2005/0092088 A1 * | 5/2005 | Blakley | 73/582 |

\* cited by examiner

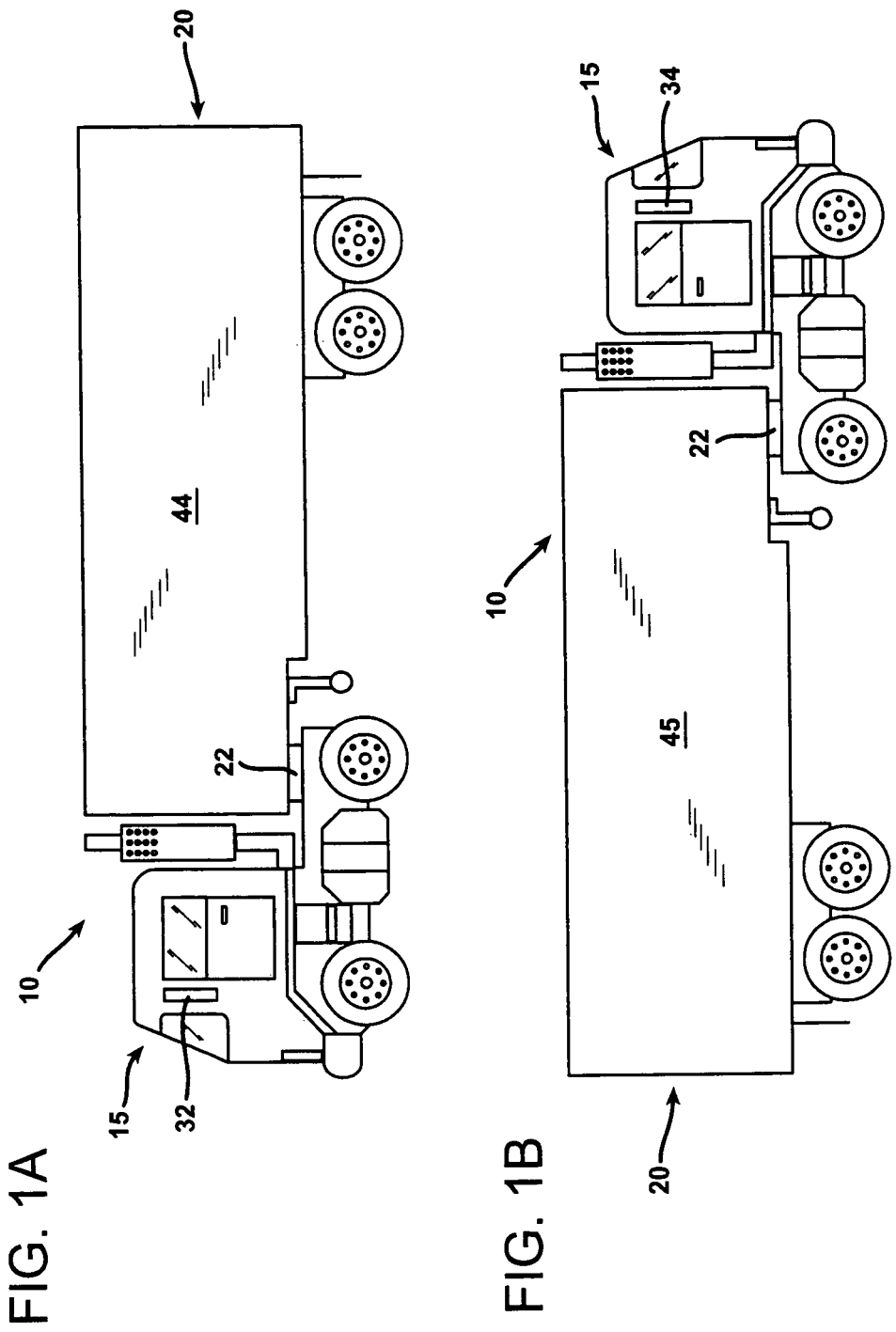

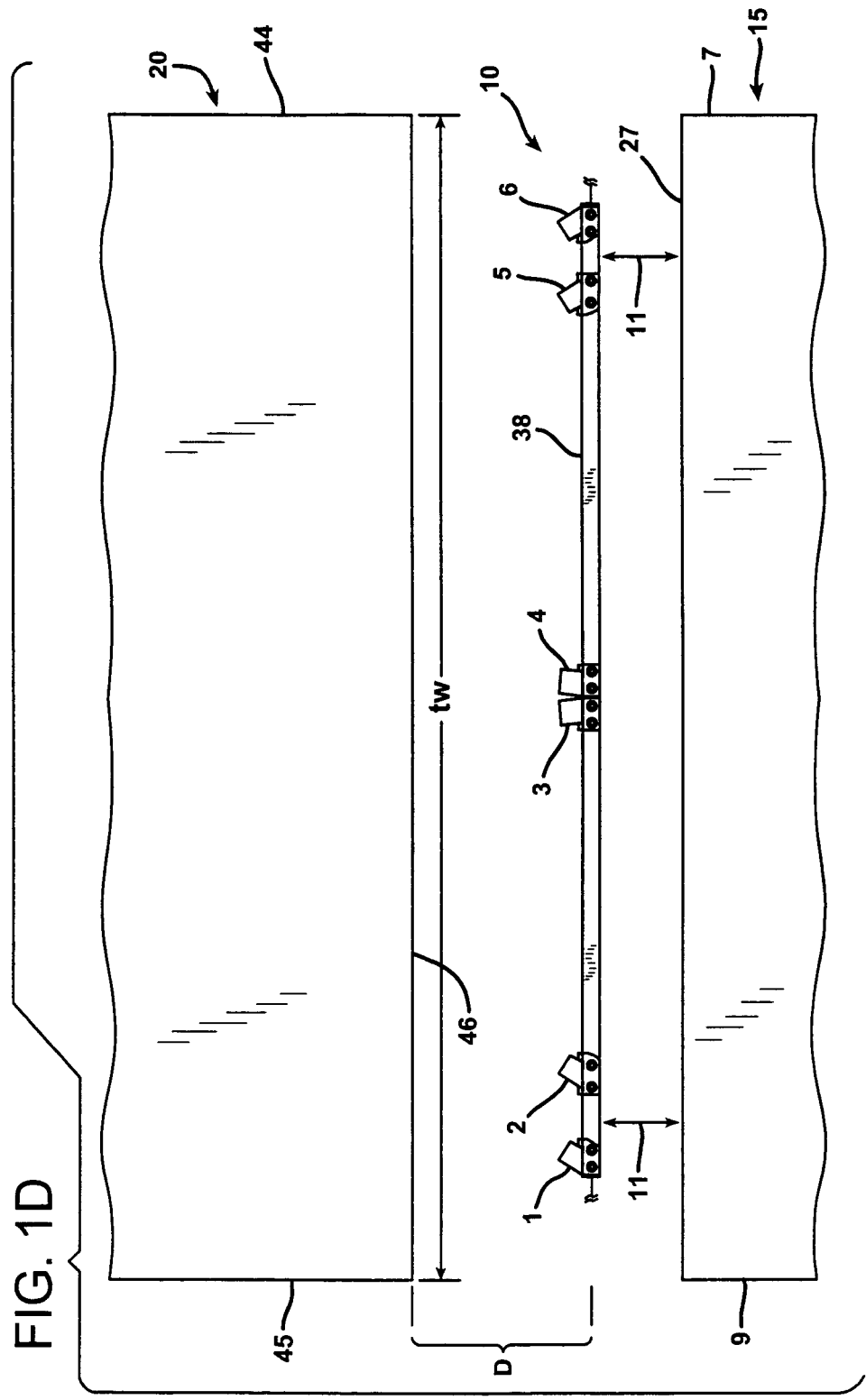

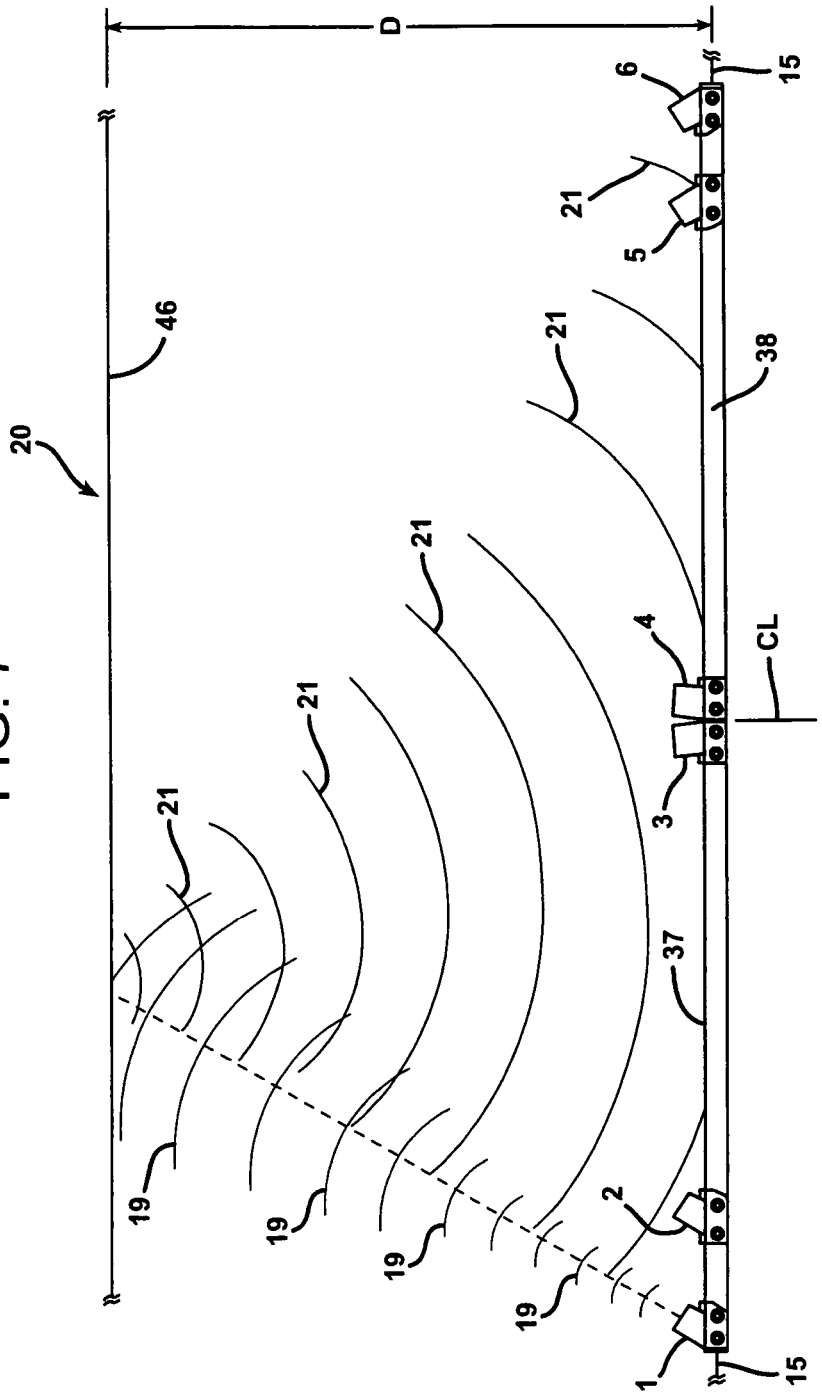

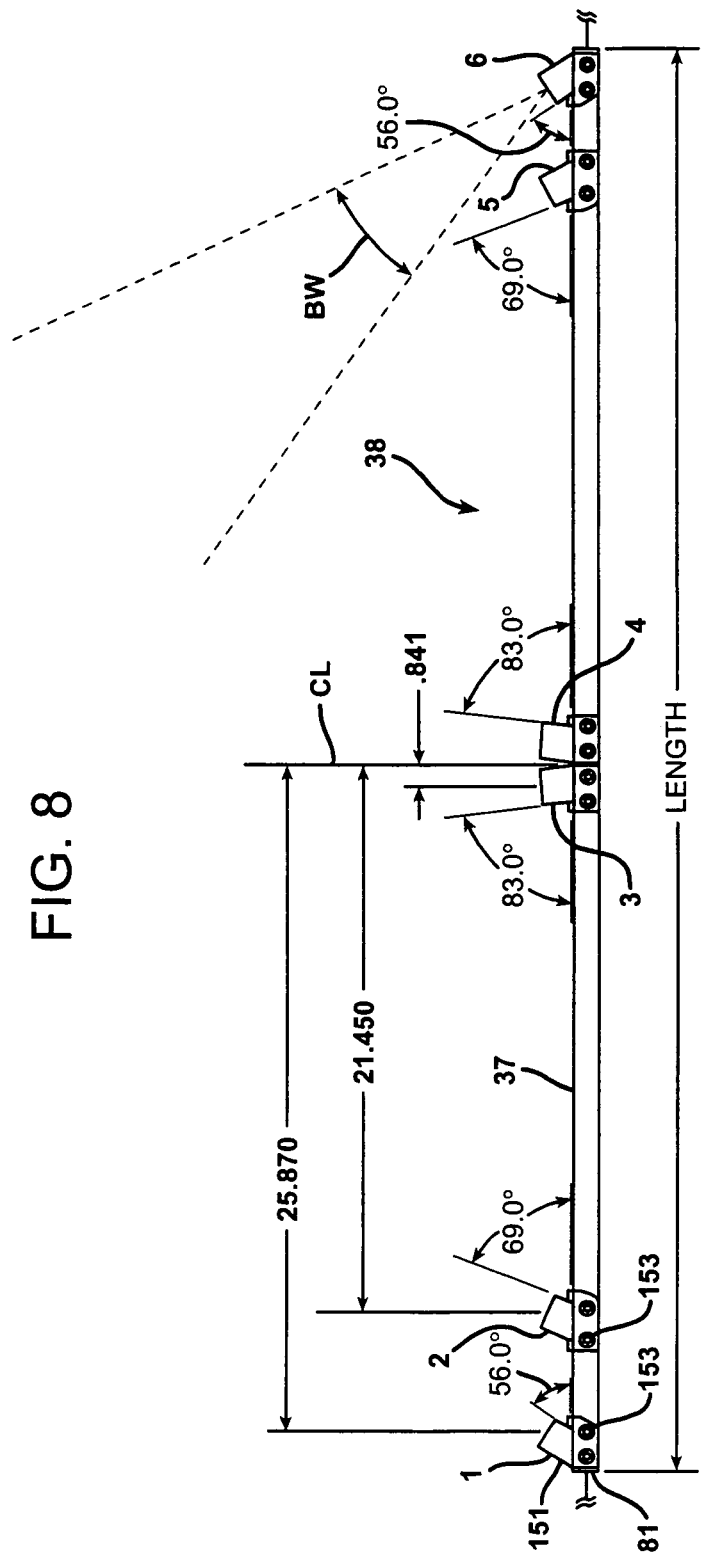

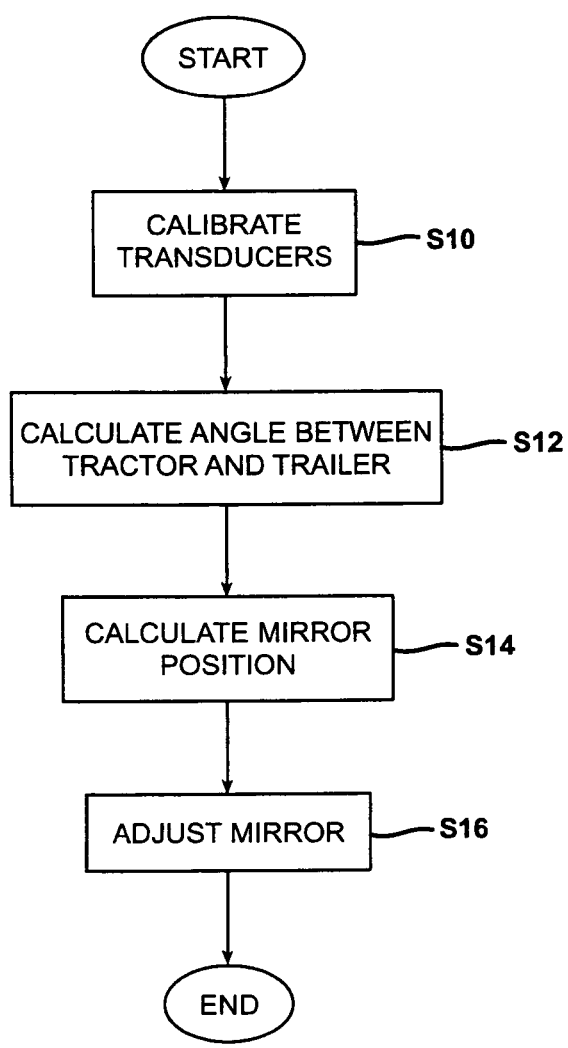

VEHICLE SAFETY SYSTEM HAVING METHODS AND APPARATUS CONFIGURABLE FOR VARIOUS VEHICLE GEOMETRIES

This application claims priority as a divisional application of U.S. application Ser. No. 10/729,788 filed on Dec. 5, 2003, now U.S. Pat. No. 7,130,727 entitled "Vehicle Safety System having Methods and Apparatus Configurable for Various Vehicle Geometries."

BACKGROUND OF THE INVENTION

1. Technical Field

The present invention relates generally to a vehicle safety system and, particularly, to a system which provides a driver with views and/or information regarding the area around a vehicle. More particularly, it relates to automatic adjusting of side view mirrors of articulated vehicles such as tractor trailers. In one aspect, the invention contemplates calculating an angle between a tractor and trailer and adjusting the mirrors accordingly. In another aspect, the invention contemplates a transducer bar and control therefor.

2. Description of the Related Art

The maneuvering ability of articulated vehicles such as tractor-trailer combinations is often hampered by the difficulty in quickly and conveniently determining the location of the rear end of the trailer and in viewing the area behind the rear end of the trailer. This is particularly so when the trailer is long and the tractor is turning away from the driver, e.g., toward the right. Typically, externally mounted side mirrors are placed on both sides of the tractor. These mirrors are rigidly positioned for straight ahead driving. Therefore, during turns, one mirror provides a view of the side of the trailer while the other mirror provides a view of the area to the side of the trailer. Neither of these views is useful. The much needed view of the rear of the trailer is not provided.

Although the driver can view the left rear end of the trailer and behind it by looking out the left window when the trailer is turning toward the left, the driver must turn his head and divert his attention away from the front of the vehicle. The driver's peripheral vision may not provide immediate perception of events occurring at the front of the vehicle. Moreover, the driver is unable to peer out the right window and view the right rear end of the trailer during a right turn. Stationary mirrors are also deficient when a tractor-trailer is backing into a loading or unloading area such as a dock during an attempt to park. In these situations, the tractor is almost always at an acute angle relative to the trailer to facilitate docking maneuvers. Stationary mirrors do not permit the rear of the trailer to be viewed during parking as the angle between the tractor and the trailer does not permit such a view. It is often necessary for the driver to leave the vehicle or to obtain the assistance of an additional person to perform the backing and parking maneuvers.

In view of these problems, numerous attempts have been made to provide a mirror which pivots or rotates to provide a view of the rear of a trailer during turns. Some of these prior art systems are disclosed in U.S. Pat. Nos. 2,988,957; 3,469,901; 3,527,528; 3,536,382; 3,749,480; 4,609,265; and 4,632,525. Many of these devices require complex mechanical devices with or without complicated electric circuits to rotate the side mirrors. Some devices are activated only by the turn signal of the vehicle.

In other prior art, tractors become equipped with a transducer bar that has multiple transducers emitting signals towards an attendant trailer. Based upon signals reflected from the trailer, and received by transducers of the transducer bar, an angle between the tractor and trailer is calculated and side-view mirrors or spotlights become adjusted accordingly. With these, however, the adjustment systems utilize mathematically fixed look-up tables (LUT's) optimized for a specific orientation (i.e., fixed length) between the tractor and trailer. LUT's also typically require collecting data from empirical testing which is labor intensive, especially if multiple LUT's are required for multiple tractor-trailer orientations. Some of these systems also require complex algorithms that cross-reference signals received by one transducer with signals received by another transducer.

In addition, transducer bars of the prior art often do not have a symmetrical orientation, which can complicate manufacturing, or they have exact angular orientation between adjacent transducers, which suppresses robustness during tractor-trailer angular computations.

Accordingly, the art of providing vehicular safety systems, especially the adjustment of mirrors or other equipment in accordance with an angle between a tractor and trailer, has need for robustness to accommodate differing tractor-trailer orientations and ease of manufacturing.

SUMMARY OF THE INVENTION

According to one embodiment of the instant invention, an apparatus for automatically adjusting the angle of a rotatable side view mirror of an articulated tractor and trailer includes transducers attached to the tractor for transmitting signals toward the trailer and for receiving signals reflected by the trailer. The transducers have a substantially symmetrical arrangement about a centerline of a linear transducer bar attached to the tractor and each has an angular orientation substantially dissimilar to adjacent transducers on a same side of the centerline. A control circuit sequentially activates ones of the transducers such that only a single transducer transmits signals at any given time. Thereafter, the control circuit only processes reflected signals received by the emitting transducer. The control circuit calculates an angle between the tractor and trailer and causes the mirrors to rotate accordingly.

In other embodiments, methods include activating ones of the transducers in sequence from left-to-right or right-to-left in a total period of about 60 msec. Methods also include calibrating the transducers at a time when the tractor and trailer have a zero angle there between. Once a driver sets a desired zero position of the mirrors, the mirror becomes rotated from the zero position by an amount calculated after the tractor-trailer angle is known.

Transducer bars for attachment to the tractor include six transducers symmetrically arranged about a centerline wherein two transducers each occupy a terminal end and two transducers exist substantially near the centerline. Two more transducers reside on the bar between the centerline transducers and the terminal end transducers. The centerline or innermost transducers have an angular orientation relative to the transducer bar opposite the remaining transducers. In one embodiment, the two innermost transducers have angular orientations of about eighty-three degrees away from the centerline. The two terminal end or outermost transducers have angular orientations of about fifty-six degrees toward the centerline while the intermediate transducers have angular orientations of about sixty-nine degrees toward the centerline. The intermediate transducers exist much closer in distance to the outermost transducers as compared to the innermost transducers.

Various additional advantages and features which characterize the invention are further pointed out in the claims that follow. However, for a better understanding of the invention and its advantages, reference should be made to the accompanying drawings and descriptive matter which illustrate and describe the instant invention.

BRIEF DESCRIPTION OF THE DRAWINGS

FIGS. 1A, 1B, 1C, and 1D provide various views of an articulated vehicle including a tractor 15 and a trailer 20 and which is equipped with the vehicle safety system of the instant invention;

FIG. 7 illustrates the operation of transducers of a transducer bar for determining an angle between tractor 15 and trailer 20;

FIG. 8 is a diagram illustrating an arrangement of the transducer bar shown in FIG. 7;

FIG. 9 is a flow chart setting forth a process for adjusting mirrors of the tractor;

DETAILED DESCRIPTION

Figure 2:
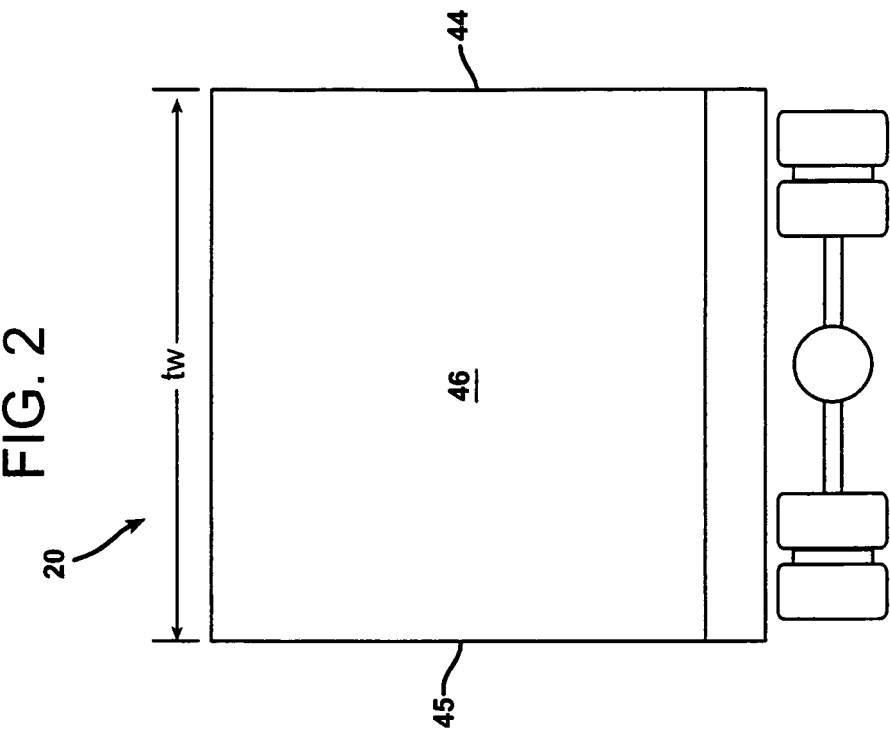
FIG. 2 is front view of the trailer 20 of FIG. 1.
Figure 1C:
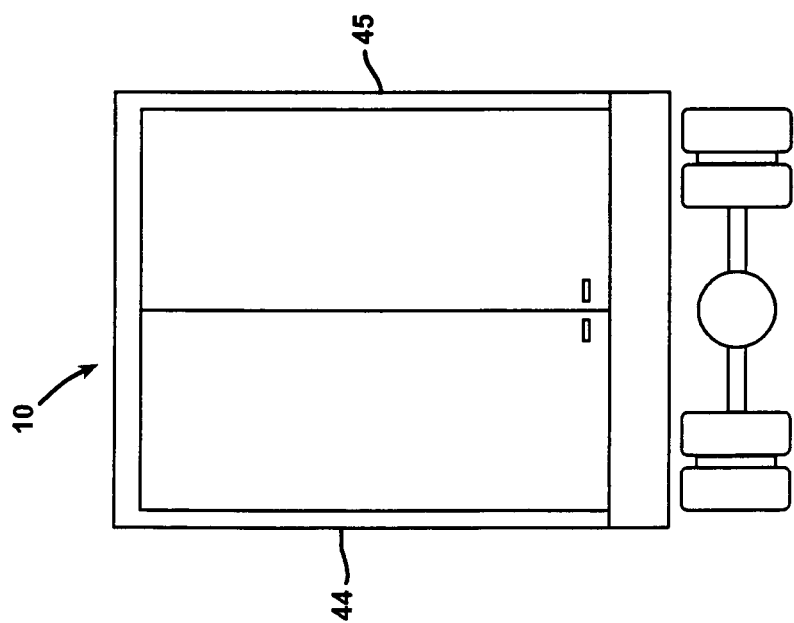

FIGS. 1A, 1B, 1C, and 1D illustrate an articulated vehicle 10 having a trailer 20 coupled to a tractor 15 and which is equipped with the vehicle safety system of the instant invention. FIG. 1A is a left side view of articulated vehicle 10; FIG. 1B is a right side view of articulated vehicle 10; FIG. 1C is a rear view of articulated vehicle 10; and FIG. 1D is an upper plan view of a portion of articulated vehicle 10. FIG. 2 is a front view of trailer 20 having a trailer width, tw. Typical trailer widths in use today include eight feet and eight feet six inches. Although the vehicle safety system of the instant invention will be described below in terms of its application to an articulated vehicle and, in particular, to a tractor-trailer combination, it will be readily apparent that the various features of the invention are not limited in this respect. Other applications include articulated cars of a train, towed and towing vehicle, car and camper, truck and boat, and tug-boat and tugged-boat to name a few.

FIGS. 1A, 1B, 1C, and 1D illustrate a tractor-trailer combination which includes a tractor 15 having a fifth wheel 22 and which is coupled to trailer 20 in a conventional manner. First and second rotatable side view mirrors 32 and 34 are secured to the cab of tractor 15. Mirrors 32 and 34 provide a driver with driver's side and passenger's side views, respectively, and the driver sets each to a desired position known hereinafter as a zero position. Of course, tractors configured for use in European countries, for example, are outfitted with a driver's position opposite that shown.

At a position aft of the cab 27 of the tractor, the tractor-trailer combination is equipped with a plurality of transducers, preferably on a transducer bar. The transducers transmit and receive signals such as ultrasonic signals which are used in the determination of the angle between the tractor and the trailer as will be described in detail below. With reference to FIG. 1D, transducers 1-6 attach to a transducer bar 38 for use in determining an angle between tractor 15 and trailer 20, whereby rotatable mirrors 32 and 34 may be appropriately rotated. As illustrated, the angle between the tractor and trailer is zero degrees. That is, the left and right side panels 44, 45 of the trailer are generally parallel with the left and right sides 7, 9 of the tractor. The transducer bar 38 is attached to the back of tractor 15 and is preferably mounted relatively close to the plane of fifth wheel 22 of tractor 15, generally parallel to the ground, to ensure that a given tractor can be utilized with many different types and sizes of trailers. It will of course be appreciated that the location of transducer bar 38 may be modified as appropriate for a particular type of tractor 15 and/or trailer 20. Transducer bar 38 may be surface mounted or recessed into the back of tractor 15 as indicated by arrows 11. In a current embodiment, transducer bar 38 is spaced a distance D (alternatively, labeled distance "Ho" in FIG. 10) in a range of forty to fifty-three inches from the front panel 46 of trailer 20, although it will be evident that the invention is not limited in this respect. Trailer 20 is illustrated as having a trailer width, tw, of either eight (8'0") feet or eight feet, six inches (8' 6"), although it will again be evident that the invention is not limited in this respect. While the use of a transducer bar is convenient, it will be appreciated that the invention is not limited in this respect and the transducers may, for example, be directly mounted on tractor 15.

Figure 3:
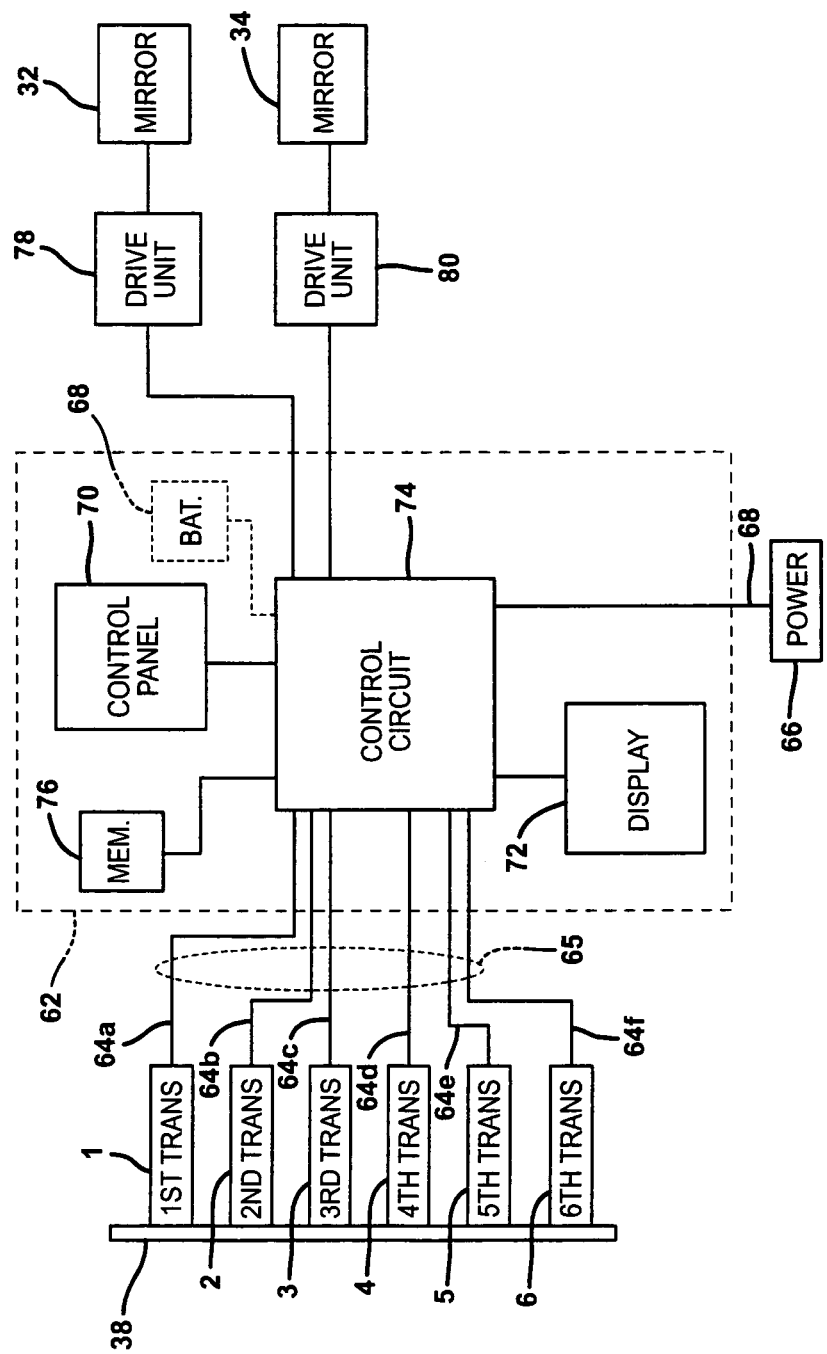
FIG. 3 is a block diagram of the vehicle safety system of the instant invention.

FIG. 3 is a system block diagram of the vehicle safety system in accordance with the instant invention. The first 1, second 2, third 3, fourth 4, fifth 5 and sixth 6 transducers of the transducer bar 38 couple to a control unit 62 over respective communication paths 64a-64g. Communication paths 64a-64g may be wired or wireless communication paths and the invention is not limited in this respect. In some embodiments, a junction box 65 may intercede between the transducer bar and the control unit 62 to offer additional user convenience. A power source 66 supplies power over power line 68 to control unit 62. Power source 66 may, for example, be the electrical system of the vehicle or an external battery. If it is desired to operate the apparatus on a voltage lower than that supplied by the vehicle, a voltage lowering device such as a transformer, a resistor or a zener diode may be placed between the power source and control unit 62. Alternatively, a replaceable internal battery 68 may be included in control unit 62. A control panel 70 provides an interface with control unit 62 for the driver. A display 72 is used to visually communicate information to the driver. If desired, a speaker (not shown) may also be provided to aurally communicate information to the driver. Control unit 62 includes a control circuit 74 such as a microprocessor which controls transducers 1-6 and display 72 and which processes driver inputs which are input via control panel 70. Control circuit 74 may, for example, be a microcontroller such as a model 68HC912D60A available from MOTOROLA. Other microcontrollers which may be utilized with the control circuit 74 include a Z-80 available from Zilog or an A51 or HD647180 from Hitachi or any other known or hereinafter developed microcontroller.

Figure 13:
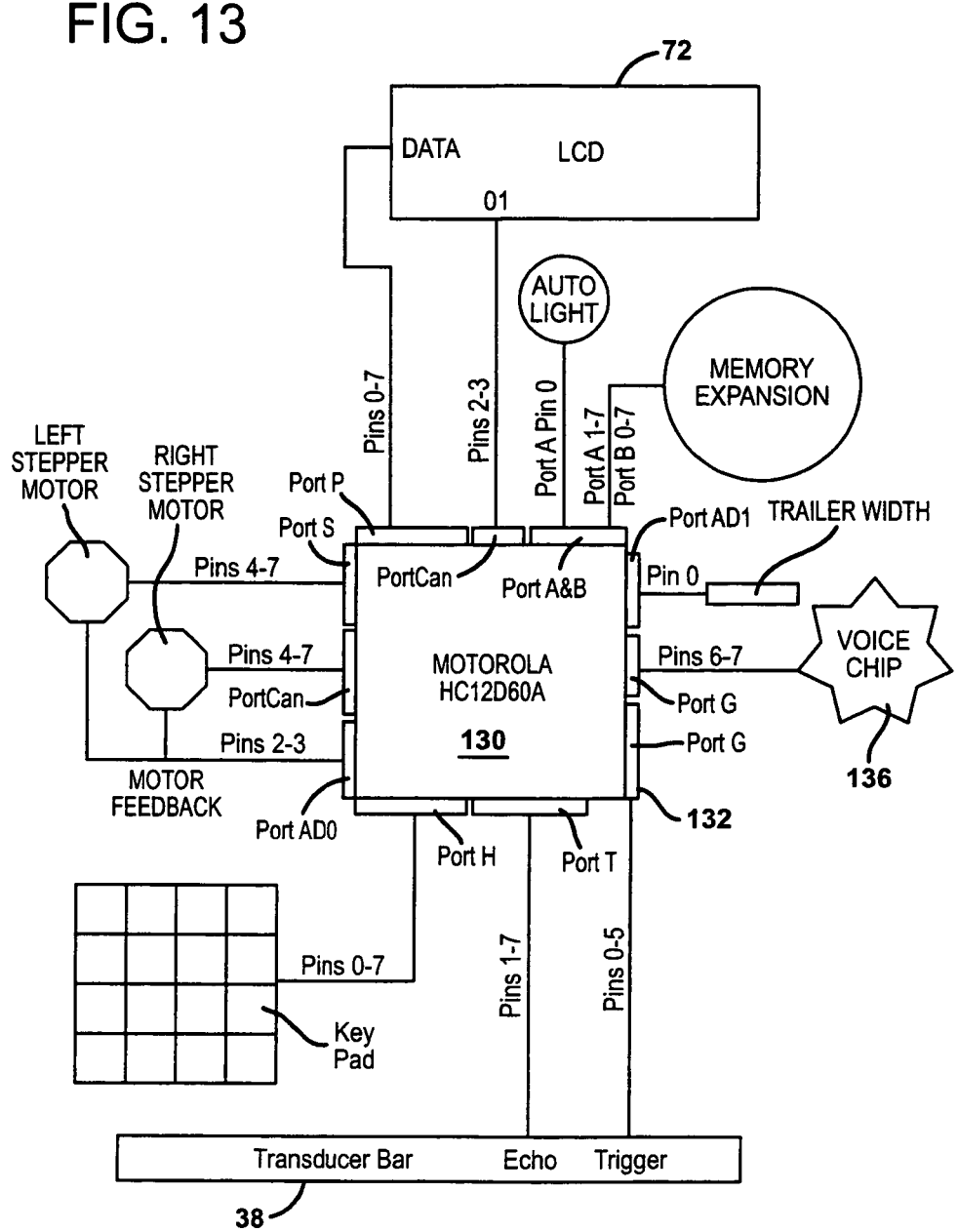
FIG. 13 is a representative configuration of the control circuit of FIG. 3, for example, embodied with a MOTOROLA microcontroller having model number 68HC912D60A.

When the MOTOROLA product is used (e.g., FIG. 13), the micro-controller 130 preferably features 60K of FLASH program memory and is available in a 112-pin TQFP package 132. The micro-controller becomes programmed initially with a RS-232 boot-loader available on the MOTOROLA website. This boot-loader allows reprogramming via a standard RS-232 serial cable. In use, the boot-loader initially loads on a blank HC12 using a Technological Arts microBDM12DX pod. As skilled artisans understand, the boot-loader is only necessary for development programming. In order for the HC12 to operate correctly, a variety of support circuitry components are generally required. The first of these components is a supervisor circuit that ensures that the microcontroller resets upon power-up. One IC applicable for this task includes a Microchip MCP120-450DI that features a reset trip voltage of 4.5 V. In order to guarantee a stable power supply, each pair of power pins on the HC12 can be decoupled using a 0.1 uF tantalum capacitor. A useful oscillator circuit for the HC12 includes an 8 MHz crystal and phase-locked-loop (PLL) filter. The PLL filter makes the oscillator circuit much more stable and it is recommended by the manufacturer.

Again, with reference to FIG. 3, a memory 76 (internal or external to the microcontroller) stores operating programs and other information which are used by control circuit 74. The operating programs are preferably factory-loaded and include a routine for generating mirror control signals for appropriately rotating mirrors 32, 34 in accordance with information which is supplied from the transducers 1-6 as will be described below. Drive units 78 and 80, preferably in the form of servo- or stepper-motors, DC motors and attendant gearing, receive the mirror control signals and appropriately rotate mirrors 32 and 34, respectively. The mirror control signals are preferably supplied to the drive units over wired communication paths, but wireless communication paths may also be used. As will be discussed below, the programs stored in memory 76 also include routines for using the information supplied from the transducers to provide information to the driver regarding the orientation of the vehicle as well as for controlling the transducers.

Figure 4:
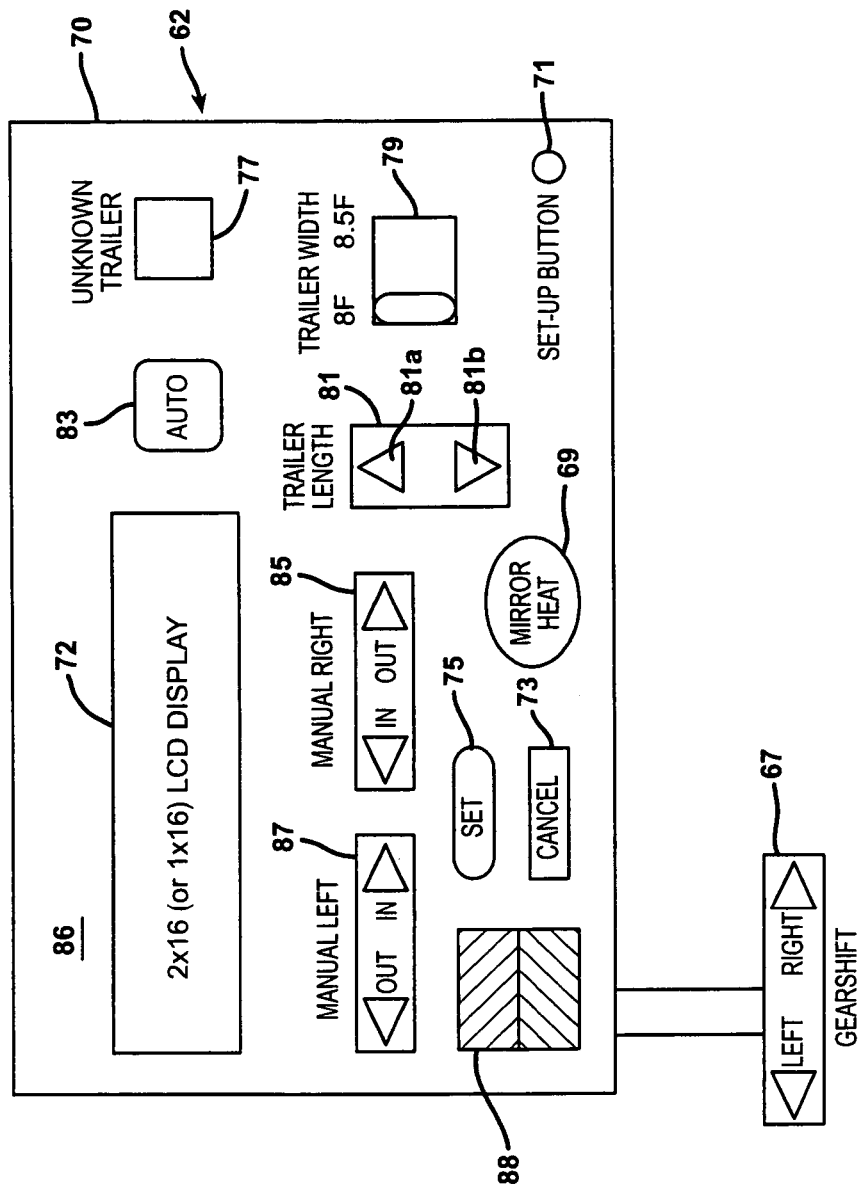
FIG. 4 is a diagram of control panel 70 of control unit 62 shown in FIG. 3.

FIG. 4 is an illustration of the front panel 86 of control unit 62. Control unit 62 is mounted in the cab or passenger compartment of tractor 15 such as on the dashboard, for example, and has an outer housing made of, for example, aluminum or a heavy grade durable plastic. Manual master ON/OFF power switch 88 controls the application of power from power source 66 to control unit 62. When in the ON position, power is coupled from power source 66 to control unit 62. Alternatively, the Manual master ON/OFF switch may be eliminated and the power coupling occurs when a user rotates the ignition key to start the vehicle. Master switch ON signal such as a light emitting diode (LED) (not shown) is illuminated when power switch 88 is in the ON position. If the automatic mirror rotating function is not desired, Manual Right and Manual Left power switches 85, 87 may be utilized by the driver to control operation of the mirrors 32, 34. If the automatic mirror rotating function is desired, Auto switch 83 is depressed. In this mode, the driver indicates initial conditions by depressing the Trailer Length button 81 in the up 81a or down 81b direction until the display 72 shows the length of the trailer. Trailer Width switch 79 is provided to initially set the width tw as either eight or eight and one-half feet. An Unknown Trailer switch 77 can also be provided for those situations in which the driver is unaware of the appropriate settings or in those situations where the trailer has an irregular shape, for example, and the dimensions become captured and recorded by the control unit. The Set switch 75 allows the driver to confirm a correct input while the Cancel switch 73 allows the drive to cancel an incorrect input. A Set-Up button 71 is depressed to inform the control unit 62 that initial conditions are being indicated. A Mirror-Heat switch 69 enables, or not, a mirror heating circuit useful in defrosting foggy or icy mirrors, for example. Finally, a Gearshift switch 67 allows the driver to control the mirror in increments or in a sweeping fashion. In one embodiment, pressing the Gearshift switch for less than two seconds allows the mirror to execute a five-degree step from its previous position. Conversely, holding the switch longer than two seconds sweeps the mirror to a desired or initial position. The switches or buttons may embody momentary center-off rocker switches, depress-and-hold, toggle or other. Of course, other control panel arrangements including keypads, pushbuttons, joysticks, and the like may be utilized and the invention is not limited in this respect. Other mirror positioning functions such as up/down tilt may also be provided, if desired.

Figure 5:
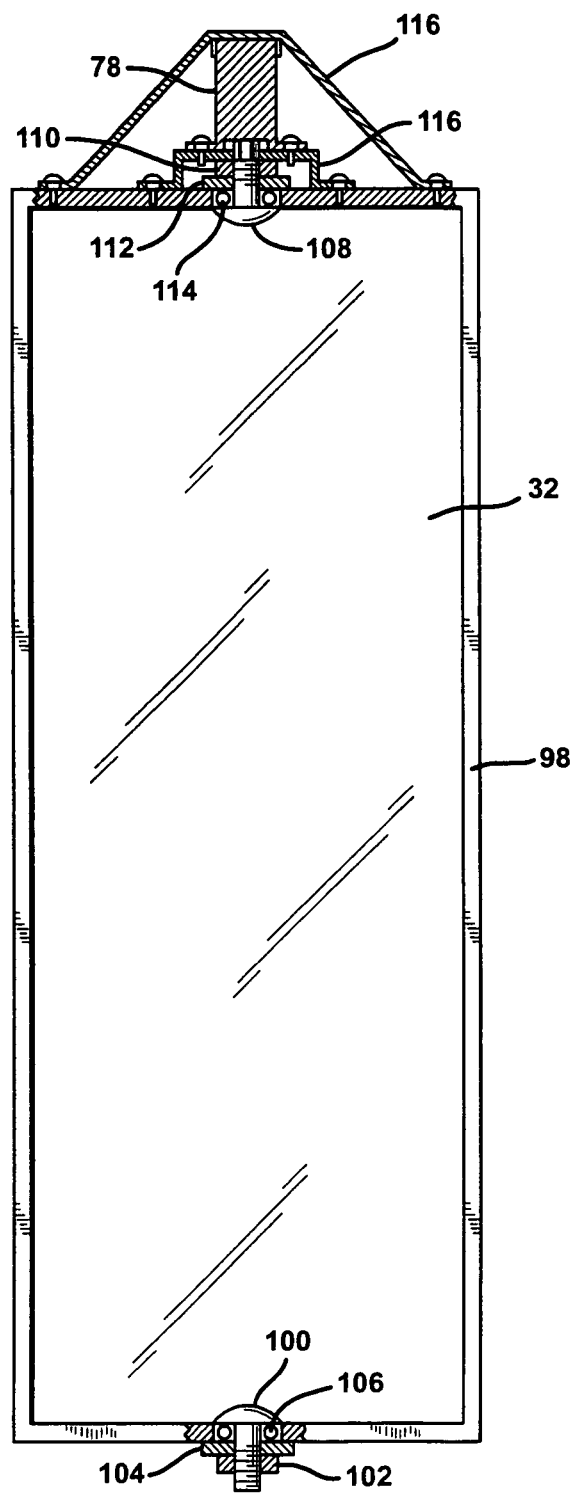
FIG. 5 is a diagram illustrating rotating mirror 32 and associated drive unit 78 for rotating mirror 32.
Figure 6:
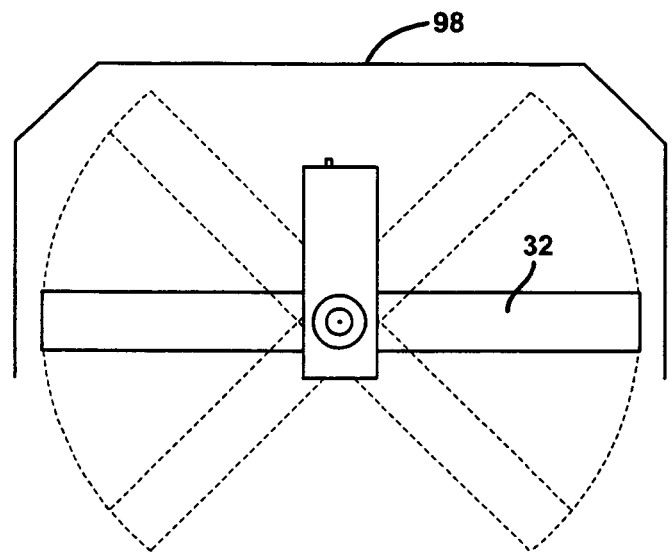
FIG. 6 illustrates a preferred range of rotation of rotating mirror 32.

FIG. 5 illustrates one embodiment of a mirror 32 and its respective drive unit 78. Mirror 32 is mounted in mirror housing 98 at its lower end by bottom mirror drive axle 100, retaining nut 102, washer 104, and greased seal bearing 106. At its upper end, mirror 32 is mounted in mirror housing 98 by top mirror drive axle 108, retaining nut 110, washer 112, and greased seal bearing 114. Alternatively, a common drive axle could replace the two top and bottom drive axles 100, 108. Drive unit 78 is mounted on top mirror drive axle 108 by mounting brackets 116 and controls the rotation of mirror 32. Mirror 32 rotates on bottom mirror drive axle 100 and top mirror drive axle 108. FIG. 6 illustrates one preferred range of motion of mirror 32 within mirror housing 98. Of course, the details of the mirror and drive unit described above are for illustrative purposes, and many different mirrors and drive units with and without mirror housings may be utilized. Mirror 34 and drive unit 80 may be similarly arranged. In alternate embodiments, the mirror may become modified such that it includes both a stationary mirror part and a rotatable mirror part. In accordance with this aspect of the invention, a driver is provided with both a view obtained when the rotatable mirror part is rotated in accordance with an angle between the tractor and the trailer as well as a view from un-rotated or stationary mirror parts. Such bifurcated mirror designs are known.

In order to effect appropriate rotation of mirrors 32 and 34, control circuit 74 monitors the angle between tractor 15 and trailer 20. If this angle exceeds a predetermined angle such as three degrees, for example, during execution of a turning maneuver, control circuit 74 generates mirror control signals for controlling the rotation of mirror(s) 32, 34. The above-mentioned predetermined angle defines a so called null zone in which no mirror rotation is effected and is provided to prevent minor steering corrections or simple lane changes from causing rotation of the mirrors. The null zone setting is configurable and may be set in memory 76 at the factory or by the driver using the rocker switches of the control panel. The null zone may of course be set to zero whereby mirror rotation is effected at all angles of the tractor and trailer. Based on the angle between tractor 15 and trailer 20 and other information, such as the length of trailer 20, an appropriate angle for rotating mirror(s) 32, 34 may be determined. Control circuit 74 then generates mirror control signals for effecting the mirror rotation and supplies the mirror control signals to the stepper- or servo-motors, or DC motors of drive units 78, 80 which drive the rotation of mirrors 32, 34, respectively. After the turn is complete and the angle between tractor 15 and trailer 20 returns to a value in the "null zone," the mirrors 32, 34 are rotated to their initial straight-viewing or zero position.

During use, with respect to transducers 1-6, the control circuit 74 activates appropriate transducers of the transducer bar using transducer control signals. The transducer control signals from control circuit 74 are emitted for example, at a rate of about one hundred times per second, and are changed ("transduced") by the transducers into ultrasonic sound waves having a speed of approximately 746 miles per hour. Based on the time it takes for ultrasonic sound waves to be reflected or echoed back and detected by the transducers, control circuit 74 calculates the distances and angles between the respective transducers and the object which reflected the waves.

In a preferred embodiment, the operation of the transducers is controlled and timed by control circuit 74. With reference to FIG. 7, a single transducer, number 1 for example, is activated for a first short period of time by a pulse from control circuit 74. This pulse is converted into sound waves as discussed above and transmitted by the transducer for the first short period of time. The sound waves appear first as waves 19 outgoing from the transducer. After the outgoing waves impact the front panel 46 of the trailer 20, for example, the waves are converted into reflected or return waves 21. The reflected waves are received by each of the transducers 1-6 of the transducer bar 38, but quite unlike the prior art, the control circuit 74 will only process the wave returned to the transducer which emitted it, e.g., transducer 1 in this example. Thereafter, the control circuit 74 causes transducer 1 to stop emitting and adjacent transducer 2 to emit. Processing then only occurs on waves returned exclusively to transducer 2. In sequence, the control circuit individually causes transducers 3, 4, 5 and 6 to emit outgoing waves of which processing only occurs on waves returned to the active or emitting transducer. Thereafter, the emitting of waves and processing of reflected waves occurs all over again in the same pattern. As a result, each transducer receives only the sound waves which it has transmitted, and distortion of the signal due to the operation of other transducers is eliminated. Further, because the transmission and receiving periods for each transducer are very short, interference from external sources is minimized. Distortion due to the operation of other transducers may also be reduced by using transducers which generate ultrasonic signals having different frequencies.

In a preferred embodiment, the time between activation of one transducer before activation of the adjacent transducer is 10 msec and the activation occurs for a period of time not to exceed 10 msec. With six total transducers it takes about 60 msec to sequentially activate each of transducers 1, 2, 3, 4, 5 and 6. Of course, different time sequencing is considered within the scope of this invention as is different patterns of creating outgoing waves. For example, instead of activating transducers in order from transducer 1 to transducer 6, it could occur in order from transducer 6 to transducer 1. It could also occur in any order. To eliminate or reduce false signals that potentially occur when reflected waves 21 impact the surface 37 of the transducer bar, the surface 37 may become roughened or angled to scatter the waves. As will be described in detail below, bear in mind that the front panel 46 of the trailer 20 will turn relative to the orientation of the tractor 15/transducer bar 38 during use and the above processing will enable angular calculations to be obtained between the trailer and tractor.

With reference to FIG. 8, the transducer bar 38 of the preferred embodiment has a substantially linear longitudinal extent of about 52 inches in the length dimension and the transducers are arranged substantially linearly thereon. The transducers are also arranged in a substantially symmetrical orientation (e.g., mirror-image) with respect to its centerline CL. In this manner, the transducer bar is relatively easily manufactured.

In one preferred embodiment, the centerline of transducers 1 and 6 reside about 25.87 inches from the centerline CL and substantially occupy the distal ends 81, 83 of the transducer bar. The centerlines of transducers 2 and 5 reside about 21.45 inches from the centerline CL. The centerlines of transducers 3 and 4 reside about 0.841 inches from the centerline CL. In other embodiments, transducers 3 and 4 exist about 1.125 inches from the CL.

Skilled artisans will further appreciate that although the transducers are symmetrically arranged, transducers on the same side of the centerline have substantially dissimilar orientations, especially angular orientation, in comparison to adjacent transducers. In this manner, more robust readings/information about the angular orientation between the tractor and trailer can be obtained with as relatively few transducers as possible. Even further, those skilled in the art will observe that the innermost transducers 3 and 4 angle opposite, relative to the centerline, in comparison to the outermost transducers 1 and 6 as well as the intermediate transducers 2 and 5.

In another embodiment, the transducers 1 and 6 are positioned at about a 56 degree angle relative to the surface 37 of the transducer bar 38 and angle toward the centerline CL. Transducers 2 and 5, much closer in distance to the outermost transducers than the innermost transducers, are positioned at about 69 degrees and also angle toward the centerline CL. Transducers 3 and 4 are positioned at about 83 degrees and angle away from the centerline CL. They also perform best if positioned as close to the centerline CL as reasonably possible.

In other embodiments, the transducer bar may only have four total transducers thereon. Preferably, such is accomplished by eliminating transducers 2 and 5. Conversely, the invention also contemplates more than six total transducers and such additional transducers would likely occupy a position between transducers 2 and 3 and between transducers 4 and 5. In such situations, the transducers would preferably angle toward the centerline and do so more or less steeply than the innermost transducer.

In general, however, more computational accuracy is obtained with more transducers, yet such occurs at a cost of additional processing time and memory. In all embodiments, preferred transducers each have a beamwidth BW of approximately 25 degrees (as representatively shown in planar view with regard to transducer 6) and are preferably suited for both wet and dry use so as to be operable in varying weather conditions. Commercially available transducers such as those used for determining depth may be utilized.

Figure 14:
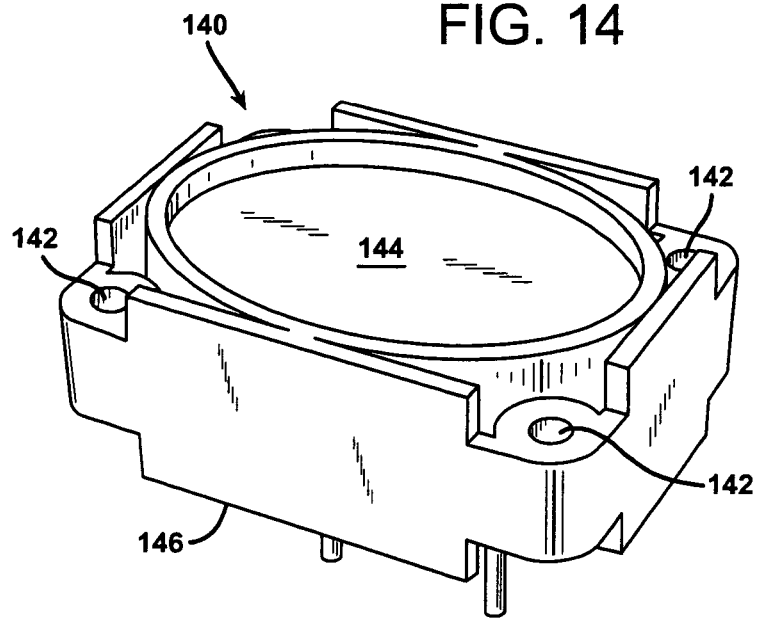
FIG. 14 is a representative configuration of a sole transducer able to transmit and receive signals in accordance with the present invention.

Representative transducers are manufactured, for example, by POLAROID as a series 9000 piezo transducer having item number PID618416. As an example, a transducer 140 useful with the invention can be seen in FIG. 14. Apertures 142 exist about the transducer periphery for inserting mechanical fasteners to secure or attach the transducer to the transducer bar 38. An area 144 corresponds generally to that surface of the transducer that emits or transmits an outgoing wave of energy and, upon reflection from the trailer, receives the return wave. In this manner, a single transducer can both transmit and receive signals without needing to operate in conjunction as a pair with another transducer whereby one transducer of the pair transmits signals while the other transducer receives signals. During use, area 144 is oriented toward the front panel of the trailer while bottom 146 is typically grounded to or touching an interior of a housing 151 (FIG. 8, for example). The housing 151, in turn, is secured by fasteners 153 to the transducer bar and angularly holds the transducers in place relative to the generally planar surface 37 (FIG. 7, FIG. 8) of the transducer bar.

With reference to FIG. 9, the general method for rotating any of the mirrors 32, 34 in accordance with an angular deviation between a tractor 15 and a trailer 20 occurs first by calibrating the transducers S10. After calibration, the angle between the tractor and trailer is calculated S12. A mirror position relative to a desired zero position set by the driver is then calculated at step S14. Finally, the mirror(s) are adjusted S16. Hereinafter, each of these steps will be described in more detail.

Figure 10:
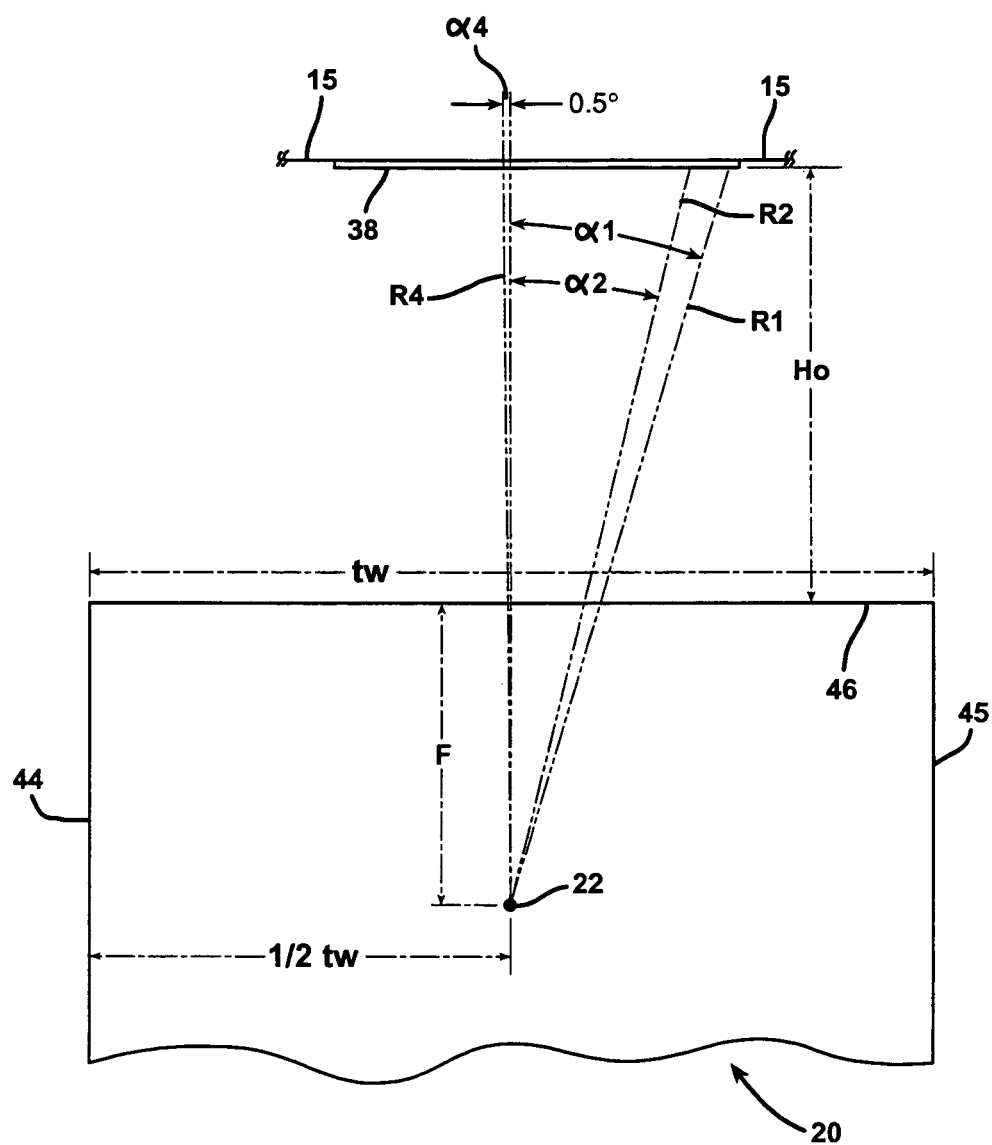
FIG. 10 is a partial top planar diagram setting forth the geometries between a tractor and trailer during calibration of the transducers of the transducer bar.

First, to calibrate the transducers S10, and with reference to FIG. 10, a driver of the vehicle 10 brings the front panel 46 of the trailer 20 into a generally parallel relationship with the transducer bar 38. In other words, the driver creates a zero degree angle between the tractor 15 and trailer 20.

Next, the angle α and straight-line distance R of each of the transducers (not shown) of the transducer bar 38 relative to the fifth wheel 22 (king-pin) are calculated. Since the transducer bar is symmetrical, calculations need only be accomplished for three of the six transducers with their results being replicated for the remaining three transducers. In this example, calculations for transducers 1, 2 and 4 will be undertaken with their results being applicable to transducers 6, 5 and 3, respectively.

The angle between the transducer 4 and the fifth wheel pivot 22 (king-pin) is shown as α4. Likewise, the angles between the transducers 1 and transducers 2 relative to the king-pin are shown as α1 and α2, respectively. The straight-line distances for the transducers 1, 2 and 4 are shown as R1, R2, and R4, respectively. The value DIST (below) corresponds to the Ho distance plus the F distance. In this example, the Ho represents that distance from the transducer bar to the front panel 46 of the trailer while the F distance represents that distance, perpendicularly, from the front panel 46 to the king-pin. Usually, the F distance is about 36 inches.

Mathematically, and based on standard geometric principles, the relationships are further defined as follows:
DIST=Ho+F;
α4=atan(0.841/DIST);
α2=atan(21.45/DIST);
α1=atan(25.87/DIST);
R4=0.841/sin(α4);
R2=21.45/sin(α2);
R1=25.87/sin(α1); and wherein the numbers 0.841, 21.45 and 25.87 represent the distance in inches between the centerline CL of the transducer bar 38 and the centerline of the transducers 4, 2 and 1, respectively, as previously shown in FIG. 8. Of course, if the transducers had different distances to the centerline CL, the equations above would change accordingly.

Figure 11:
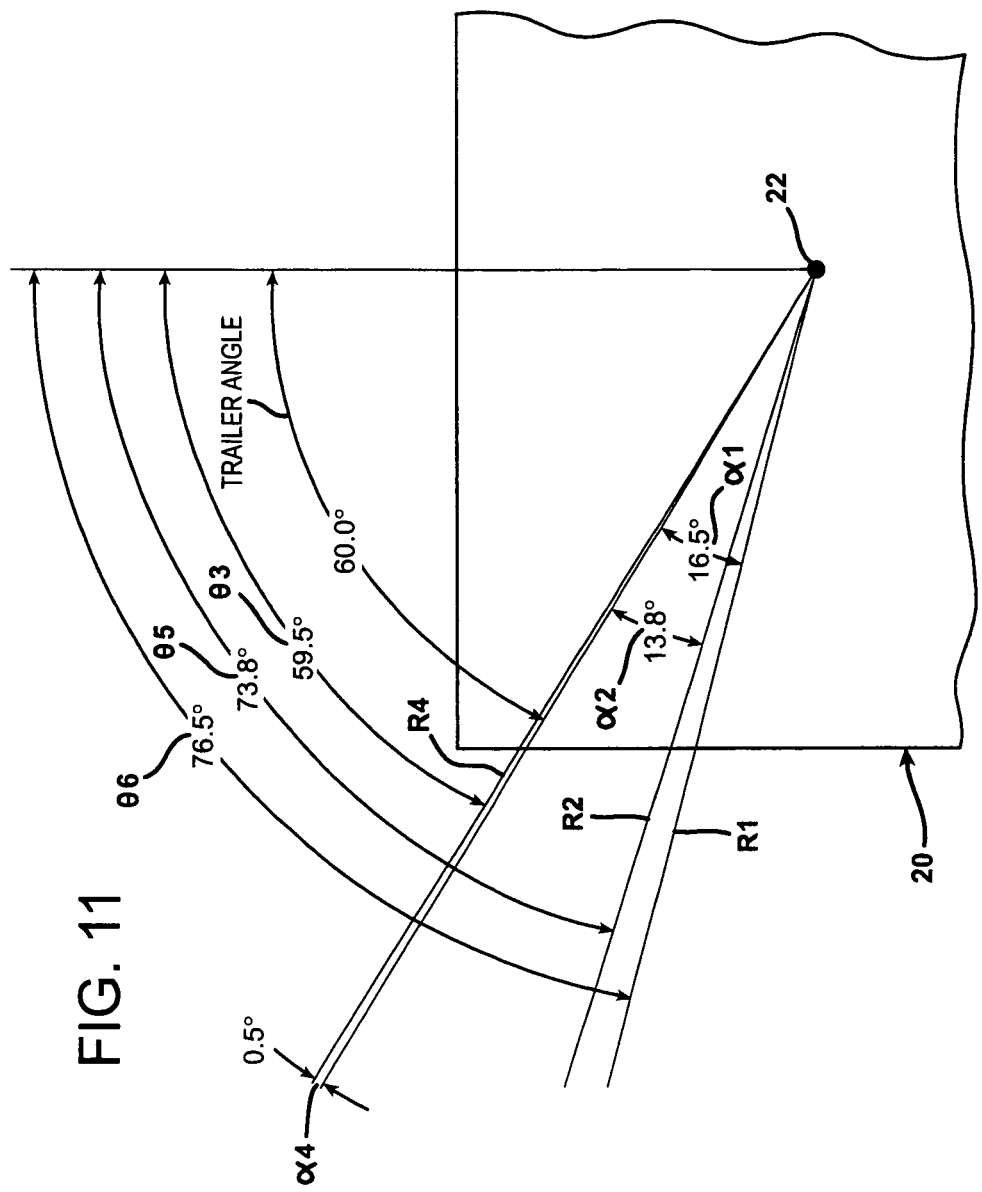
FIG. 11 is a diagram of a representative example of the invention setting forth the geometries between the tractor and trailer of FIG. 10 when the tractor is angled about sixty degrees to the left of the trailer.

With reference to FIG. 11, and appreciating that the tractor 15 has pivoted some angle during use with respect to the trailer 20, the angle of the tractor relative to the trailer will be determined as shown at step S12, FIG. 9. As illustrated, the tractor 15 has pivoted leftward about sixty degrees although the amount is unknown at this time to the control unit 62. The angle θ will now represent how much each transducer has pivoted and such can be calculated. Specifically, the angle θ of each of the transducers relative to their initial calibration is as follows (appreciate, however, only angles θ will be shown for transducers 1, 4, 6 and 3):
θ4=acos(t4+F)/R4;
θ1=acos(t1+F)/R1;
θ6=asin(t6+0.5*tw)/R1;
θ3=asin(t3+0.5*tw)/R4;

wherein the variables t1, t3, t4 and t6 correspond to the respective time it takes an outgoing wave of energy to return to the transducer from which emitted it as previously described in relation to FIG. 7.

Once the angles θ have been calculated, the angle of the tractor relative to the trailer, as determined by each of the transducers becomes calculated by adding or subtracting the angle θ with the angle α in accordance with the formulas:

When the tractor is at a positive direction (e.g., right turn):
Trailer angle calculated by transducer 4: Trailer_angle4= (θ4−α4);
Trailer angle calculated by transducer 2: Trailer_angle2= (θ2+α2);
Trailer angle calculated by transducer 1: Trailer_angle1= (θ1+α1);
Trailer angle calculated by transducer 6: Trailer_angle6= (θ6−α1);
Trailer angle calculated by transducer 5: Trailer_angle6= (θ5−α2); and
Trailer angle calculated by transducer 3: Trailer_angle3= (θ3+α4).

When the tractor is at a negative direction (e.g., left turn):
Trailer angle calculated by transducer 4: Trailer_angle4= (θ4+α4);
Trailer angle calculated by transducer 5: Trailer_angle5= (θ5+α2);
Trailer angle calculated by transducer 2: Trailer_angle2= (θ2−α2);
Trailer angle calculated by transducer 1: Trailer_angle1= (θ1−α1);
Trailer angle calculated by transducer 6: Trailer_angle6= (θ6+α1); and
Trailer angle calculated by transducer 3: Trailer_angle3= (θ3−α4).

Therefore, at any given tractor-trailer position, there will be six calculated results (corresponding one-to-one with each of the transducers 1-6 of the transducer bar 38) representing the tractor-trailer angles. Some of the calculations may give a negative value and some may be larger than 90 degrees which are apparently not valid results and are discarded.

After calculating the above six angles, software in the control unit will use a series sequence routine of judgment to finally decide which calculated angle will be used as the "real" or "actual" trailer angle at any given position. As an example, consider the following preferred sequence:

1) If (0<Trailer_angle4<16) then assign Trailer_angle4 as the actual trailer angle;

2) If (17<Trailer_angle1<50) then re-assign Trailer_angle1 as the actual trailer angle even if the previous value has been assigned by Trailer_angle4 because this statement comes later and has higher priority;

3) However, if (Trailer_angle1≤17) or (Trailer_angle1≥50), the actual trailer angle maintains its previously assigned value, which is Trailer_angle4 in this case; and 4) If (16<Trailer_angle2<22) then re-assign Trailer_angle2 as the actual trailer angle, otherwise trailer angle remains unchanged.

The sequencing continues through all six calculated results. Eventually, there should be at least one valid value that is finally assigned as the actual trailer angle.

In general, throughout a 90 degree turn either side of center ("center" referring to the tractor and trailer having a zero angle), more than one of transducers 1-6 is opposite a surface portion of front panel 46 of trailer 20, whereby an echo or reflected wave will be returned. However, not every surface portion from which an echo can be "bounced" will have sufficient linear movement towards or away from the transducer to resolve increments of the turning motion. For example, reflections from surface portions located near the pivot point (king pin) are less useful for determining the angle between tractor 15 and trailer 20 since the linear movement of these portions changes very little per degree of turning. Accordingly, the transducers used in the angle determination should be arranged such that at all angles of interest there is at least one transducer which is opposite a surface portion of front panel 46 of trailer 20 having sufficient linear motion to resolve increments of turning motion.

Figure 12:
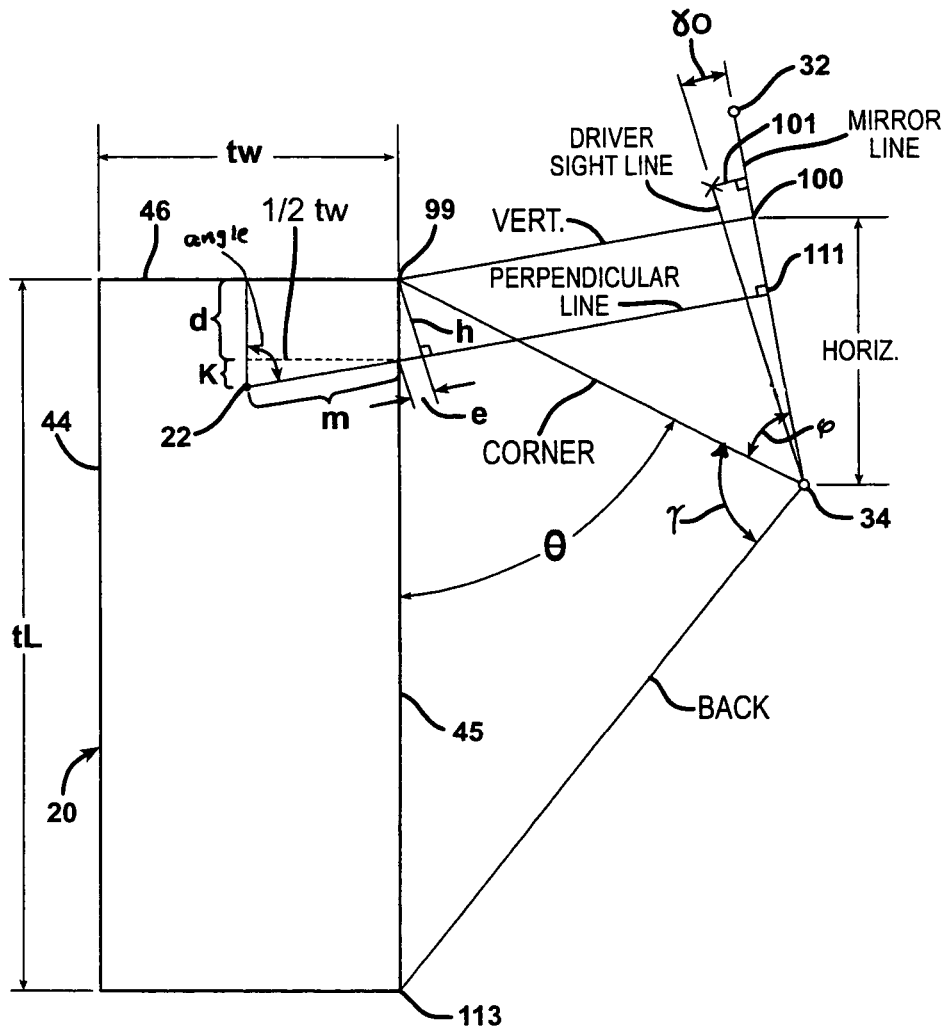
FIG. 12 is a partial top planar diagram of a representative example of the invention setting forth the geometries between a tractor angled about eighty degrees to the right of a trailer to allow calculation of a mirror position relative to a zero mirror position set by a driver.

With reference to FIG. 12, and appreciating the next step in the flow diagram of FIG. 9 relates to step S14, calculating mirror position, the geometry between left and right mirrors 32, 34 of a tractor and a trailer 20 is as follows:

Angle αo corresponds to the angle between the mirror line, between the left and right mirrors 32, 34, and the driver-sight line, between the driver's position X and the right mirror 34 (or left mirror 32 if the driver is turning left). Skilled artisans will appreciate that the distances of the mirror line and the driver sight line are fixed and measurable as is the distance of the line 101 from the driver's position X, perpendicularly, to the mirror line;

Thereafter, variable K corresponds to K=(0.5*tw)*(tan (90-angle); wherein the variable angle is that angle previously calculated between the tractor and the trailer.

Once K is known, variable d is determined as distance F (FIG. 10), typically 36 inches, minus K or d=F−K or 36−K;

Then, variable e and h are calculated as e=d*cos(angle) while h=d*sin(angle), wherein variable h is that line from the corner 99 of the trailer perpendicularly drawn to the "Perpendicular Line" described below; variable e is that line segment of the Perpendicular Line from the right panel 45 of the trailer to the variable h intersection point;

Perpendicular Line, which always extends from the king-pin 22 perpendicularly to the mirror line (alternatively, the Perpendicular Line is defined as variable "fifth" below in the equations because it extends from the "fifth-wheel" or king pin to the mirror line), has a portion, m, thereof that extends from the king-pin 22 to the right panel 45 of the trailer and is defined as m=(0.5*tw)/sin(angle);

The variables "vert" line, parallel to the perpendicular line and extending from the corner point 99 of the trailer to the mirror line, and "horiz" line, on the mirror line from the vert intersection 100 to the mirror 34, are found in order to calculate the angle φ. Specifically, vert=fifth−e−m while horiz=12+0.5*tw+h, wherein "12" is a distance in inches corresponding to a distance from position 111 minus ½ tw; the angle φ then becomes φ=atan(vert/horiz).

The "corner" line, from trailer corner 99 to the right mirror 34, then becomes corner=vert/sin φ;

Angle θ, although not the previously defined angle of the transducers, becomes θ=90−angle+φ;

The "back" line, from right mirror 34 to the position back trailer corner 113, equates to back=sqr(corner$^2$+tL$^2$−2*corner*tL*cos(θ));

In turn, γ=acos((corner$^2$−tL$^2$+back$^2$)/2*corner*back));

Finally, the angle of "mirror" (the right mirror 34 in this example) is to be adjusted relative to the driver's set zero position (step S 16, FIG. 9) by an amount according to the equation mirror=(γ+φ−αo)/2+90.

Accordingly, skilled artisans will now appreciated that the transducer system as illustrated in FIGS. 7 and 8 enables control circuit 74 to simply, while efficaciously, calculate the angle of trailer 20 relative to tractor 15 based on the distances between the back of tractor 15 and front panel 46 of trailer 20 as determined by transducers 1-6 without the assistance of any look-up tables. It will also function regardless of the distance Ho between the transducer bar 38 and the front panel 46 of the trailer 20.

Once the variable "mirror" is found, mirror control signals for controlling mirrors 32, 34 are generated by control circuit 74. These control signals are supplied to drive units 78 and 80 for appropriately controlling rotation of mirrors 32, 34. The signals are supplied to the appropriate driver units in a very short period of time, for example, at a rate of approximately eleven times per second, thereby permitting precise movement of the mirrors. The system of the instant invention may also be set up so that when the tractor-trailer is turned in one direction, both mirrors turn. In which case, for example, in turning left, the left mirror rotates to enable viewing the rear of the vehicle while the right mirror rotates to some desired location to allow the driver to view that area of the trailer to the side of the right panel of the trailer. Alternatively, the system may be set up so that during a left turn, only the left mirror rotates, and during a right turn, only the right mirror rotates. The control circuit 74 may further include a warning routine which generates a warning signal, for example an audible warning signal via a speaker, when the angle between tractor 15 and trailer 20 is ninety degrees or approaching it and the tractor and trailer are in jeopardy of a "jackknife" orientation. The audible warning may be a voice warning such as "Warning! The trailer is in a jackknife position." The voice chip 136 (FIG. 13) may be used in this regard. In addition or alternatively, a visual warning of the jackknife position may be provided on display 72.

Control circuit 74 follows trailer 20 through its full range of 180 degrees relative to tractor 15. In the event the transducers determine that no trailer is hooked up to tractor 15, control circuit 74 preferably automatically resets mirrors 32 and 34 to the normal or zero position. The transducers may also be disabled by moving power switch 88 to the OFF position when no trailer is attached to the vehicle. Furthermore, any malfunction of the transducers or other components results in control circuit 74 returning and maintaining the mirrors in the neutral position until the faulty part is repaired. The transducers thus generate appropriate control signals for rotating a mirror to permit viewing down the length of a trailer towards a dock or a loading area.

It will be recognized that although a tractor-trailer containing the transducers has been described above, the instant invention is in no way limited in this respect. Thus, a tractor-trailer may utilize any one or more of the transducers to rotate a safety spotlight (not shown) to a desired area or effectuate any other safety or other measure.

Although the above embodiments are described in terms of using ultrasonic waves, the invention is not limited in this respect and other waves of different frequencies may be used.

The United States patents referenced above are hereby incorporated by reference into this application in their entirety. Numerous characteristics and advantages of the invention have been described in detail in the foregoing description with reference to the accompanying drawings. However the disclosure is illustrative only and the invention is not limited to the precise illustrated embodiments. Various changes and modifications may be affected therein by one skilled in the art without departing from the scope and spirit of the invention.

What is claimed:

1. A system for calculating an angle between an articulated tractor and trailer, comprising:
   a plurality of transducers arranged on said tractor, each transducer operable to transmit and receive signals; and a control circuit operative to control said plurality of transducers, wherein said control circuit activates ones of said plurality of transducers such that only a single transducer of said plurality of transducers transmits signals at any given time and said control circuit only processes a return signal received by said single transducer.

2. The system of claim 1, wherein said tractor has a rotatable side view mirror and further including a drive unit for rotating said rotatable side view mirror based on said angle.

3. The system of claim 2, wherein said plurality of transducers are calibrated.

4. The system of claim 1, wherein said plurality of transducers are arranged substantially symmetrically about a centerline of a substantially linear transducer bar and oriented towards said trailer, each transducer having an angular orientation substantially dissimilar to adjacent transducers of said plurality of transducers on a same side of said centerline.

5. The system of claim 4, said transducer bar further including an innermost transducer and an outermost transducer on said same side that angle in opposite directions relative to said centerline.

\* \* \* \* \*